Patented Oct. 21, 1930

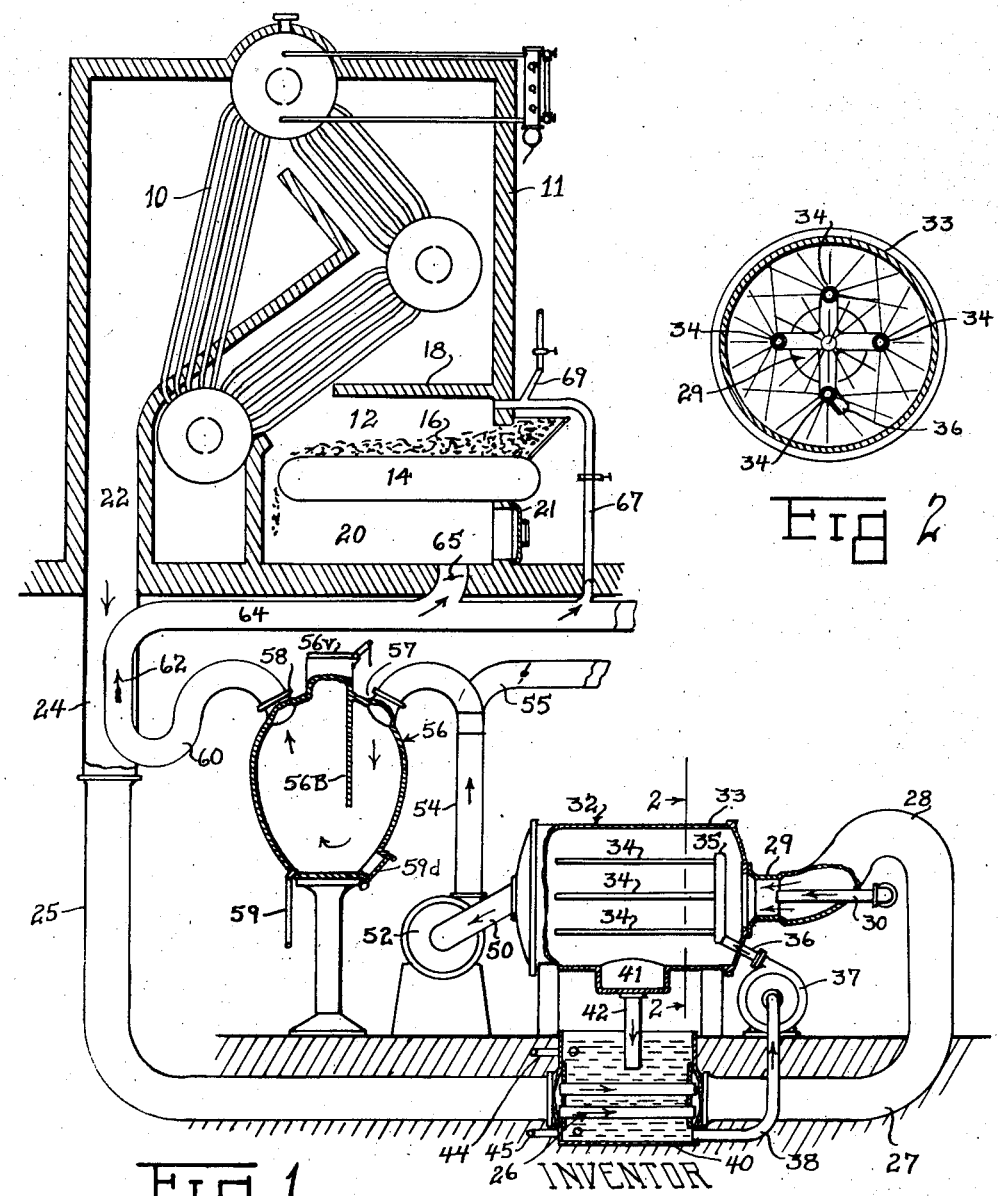

1,779,282

UNITED STATES PATENT OFFICE

WALTER LOUIS, OF CHICAGO, ILLINOIS

BOILER-HOUSE SMOKE-DISPOSAL PROCESS

Application filed January 29, 1927. Serial No. 164,493.

This invention relates to smoke elimination, more especially to a boiler house smoke disposal process.

It is the object of this invention to provide means whereby smoke and fumes discharged from furnaces may be cleansed and purified for the elimination of the present smoke nuisance.

The purpose of this invention is to provide a process whereby the fumes, vapors, gases and solid matter arising from fuel consumption may be disposed of for the elimination of noxious discharges, for the recovery of valuable products and for a substantial increase in thermal efficiency of the plant as a whole.

I am aware that attempts have been made to purify the gases discharged from boiler furnaces but these earlier inventions have failed in the accomplishment of the beneficial results obtained in my present invention in that they have wasted the valuable byproducts contained in such gases and have failed to recover and utilize the large quantity of total heat from the fuel inevitably carried by such gases and wasted in their disposal. It is the particular objects of this invention to accomplish the purification of the gases, to recover the byproducts, and to simultaneously recover the heat heretofore wasted both in purification and in discharge of the purified gases.

The contamination of the atmosphere resulting from the discharge of increasing volumes of smoke and fumes generated in the combustion of fuels has proven so injurious to surrounding property and to human life itself that the existence and enforcement of smoke ordinances is common in most of our larger communities. Various devices have been invented and applied with a view to assisting both in meeting these ordinances and in preventing the actual damage resulting from this heretofore unavoidable nuisance. Primarily it is my object to prevent this contamination and to eliminate the danger to life and property resulting therefrom. A no less important object of this invention, however, and one which my herein disclosed invention provides means for accomplishing at one and the same time with my primary object, is the increase in efficiency of the plant as a whole and as a fuel heat extracting means.

It is a secondary object of this invention to provide a condenser device particularly adapted for the accomplishment of the above set forth objects and of such simple and durable construction as to involve minimum construction and installation costs while at the same time able to meet continuous severe operating conditions without failure or interruption.

It is the further object of this invention to provide means for feeding the said gases to the condenser above mentioned and for removing them therefrom in such manner that a large part of their heat may be effectively utilized.

It is also the object of this invention to provide a process whereby the gases, fumes and the like discharged from fuel combustion apparatus may be treated to remove therefrom all solid particles, useful heat, and the like so that they are rendered suitable for the use in assisting the combustion of new fuel fed to the said apparatus.

Certain other objects and improvements accomplished by my invention and by the performance of my process will be made evident as the description of the appended drawings progresses and will be more specifically set forth in the claim.

Referring to the drawings in which like numerals have been employed to indicate like parts throughout:—

Fig. 1 is an elevation of a complete embodiment of apparatus suited to perform my invention as applied to a steam boiler plant; it being understood that certain parts are broken away for purposes of description.

Fig. 2 is a cross sectional view of the condenser shown in Fig. 1 and is taken on line 2—2 of Fig. 1.

Briefly stated, my invention contemplates the removal of the waste products arising from furnaces (such as flue gases and the like) to a condenser where they are cooled and washed after a series of precooling or heat interchange steps. The reduced volumes of purified gases are then removed to a separator wherein excess moisture and material precipitated thereby and therewith, is removed from the gas stream which is then returned to the furnace to pass over or through the zone of combustion and to give up such further heat units as may be contained therein. As will be more clearly understood from the detailed description below, utilization of heat heretofore wasted, whether it be existent in the gases as heat or as fuel capable of giving up heat, is second only to the consumption of noxious fumes and removal of injurious solid matter in the accomplishment of my invention.

Referring to the drawing:—The boiler 10 mounted within the setting 11 is heated by the furnace 12 wherein a grate or stoker 14 supports fuel bed 16 below the combustion assisting arch 18 and above the ashpit 20. Gases, and solid material held thereby, arising from the fuel bed 16 passes under the arch 18 around the tube banks of the boiler 10 and thence to the flue connection 22. It will be understood that the arrangement and form of boiler furnaces varies considerably and that the parts above mentioned are but for purpose of illustration since manifestly my invention is equally applicable to any type of boiler furnace, to incinerators, and in fact to any furnace wherein fuel, be it solid, liquid, or gaseous, is consumed and gases given off.

Gases from the flue connection 22 pass onward through flue section 24 to flue 25 discharging through tubes 26 to a further flue section 27 leading to an inverted U section 28 terminating in a reduced section or nozzle 29 wherein the gases are mixed with exhaust steam introduced through pipe 30 as they pass into the the body of condenser 32.

The reduced volume of gases after treatment in condenser 32 is drawn through connection 50 to fan 52 which discharges through duct 54 to separator 56 and thence through duct 60 to reheater 62 in the flue leaving the boiler. Reheater 62 in turn discharges to distribution duct 64 having a connection 65 provided with a suitable valve leading to ashpit 20. Other connections, such as that indicated at 67 lead to other points in the furnace for purposes which will be described.

Condenser 32 preferably consists of a shell 33 mounting a plurality of tubes 34 connected to a suitable header 35 and perforated so as to discharge liquid introduced therethrough in intermeshing sprays (indicated in Fig. 2) so that gases entering the shell 33 through nozzle 29 must pass through these sprays before reaching escape connection 50. Liquid is introduced to header 35 through pipe 36 by the pump 37 whose suction 38 draws from hotwell 40. Liquid falling from the sprays after passing through the gases in the condenser shell collects in the sump 41 opening through pipe 42 to hotwell 40 below the normal water line therein so that shell 33 is sealed from the atmosphere and a vacuum may be maintained therein.

Hotwell 40 preferably consists of an open tank having suitable tube sheets in its walls for the mounting of tubes 26 which conduct the gases between flue sections as described above. Hotwell 40 may also be provided with suitable connections 44 and 45 through which liquid may be introduced and withdrawn when more is required or when its heat is utilized elsewhere;—for instance hot water heating or boiler feed and the like.

Duct 54 normally leads to separator body 56 but is preferably provided with a branch 55 having a suitable valve therein which may be operated to release the gases prior to entering the separator.

Separator 56 consists of a hollow shell having an inlet 57 and an outlet 58 together with a suitable liquid drain 59 and cleanout door $59^d$. At the top of the separator shell a relief valve $56^v$ is so arranged that an overpressure or other undesirable condition inside the separator may be vented either automatically or manually as desired. Baffle 56B serves to arrest the gas flow, to assist the separating action, and to direct separated material or liquid to the bottom of the separator.

Ashpit 20 is preferably provided with suitable doors or valved openings 21 through which additional air may be admitted while the "overfire" connection 67 preferably joins with a pipe 69 through which air, powdered fuel, fuel oil and the like may be introduced to the gas stream if desired.

In operation;—The products of combustion from the furnace are first cooled and reduced in volume by heat exchange with the returning treated gases in reheater 62; further cooling and reduction in volume occurs in tubes 26 the hotwell liquid serving as the cooling and heat exchange medium in this case. Introduction of steam or water vapor from pipe 30 at the restricted nozzle 29 serves to further cool the gases while the thorough mixing with finely divided water particles assists in forming the smaller dust and fume particles into larger ones (the water particles acting as nuclei) many of which fall of their own weight when the gases again expand into the condenser shell 33. The water sprays discharged from pipes 34 materially aid the precipitating action while at the same time washing and precipitating the gases as a whole so as to condense the same. The washing action also serves to aid chemical action and combination between the washing liquid (which may be water or other suitable liquid with or without a reagent added thereto) removing sulphur and acid fume and particles to the hotwell whence they may be withdrawn through connections 44 and 45 for recovery or disposal. Connections 44 and 45 not only provide for removal for chemical or mechanical treatment of the wash liquid but also provide conduits through which the liquid may be circulated to further radiators or heat exchanges wherein a substantial quantity of the heat in the wash liquid may be caused to perform a useful purpose. Gas withdrawal from shell 33 is preferably assisted by fan 52, the condenser being operated at less than atmospheric pressures under the seal provided by pipe 42 but it will be understood that in many cases the velocity of vapor issuing from pipe 30 will aid or displace the fan action and some pressure may exist within shell 33.

Gases passing through duct 54 will have again assumed a substantial velocity and since they necessarily carry some moisture from the condenser proper it will be understood that the sudden reduction in velocity provided by the increased volume of separator body 56 will be aided by baffle 56B to afford complete final cleaning of the gases in this separator from which liquid and deposited materials are cleaned by connections 59 and 59ᵈ (the gases being temporarily directed through duct 55 when it is desired to work inside the separator body).

The thoroughly cleaned and purified gases are then passed on to the reheater 62 which serves the double purpose of precooling the gases coming direct from the furnace and of heating the cleaned gas which is then passed to the furnace air supply chamber 20 (ashpit in this case) it being understood that these gases contain considerable quantities of unconsumed fuels and that any deficiency in volume or in oxygen is preferably made up through a suitable air supply 21.

In plants employing liquid or pulverized fuels (oil, pulverized coal, wool shavings or waste, and the like) I prefer to utilize a portion of the hot clean gas to distribute or atomize the fuel through suitable pipe arrangements similar to 67 and 69 it being understood that in such instances fan 52 may act as a suitable compressor and a pressure be maintained sufficient for the purposes described or a separate compressor employed after the manner well known to those skilled in the art. Any surplusage of gases may be passed off through duct 55 if desired but will in any case be cared for through operation of lid 56ᵛ automatically relieving any over pressures.

It will be understood that while the parts of my improved apparatus are shown mainly below the boiler level the whole system may be arranged thereon or thereabove as space permits. However where possible I prefer to set the hotwell either on the first floor level with the boiler or in the basement below; to set the condenser at least ten or twelve feet above the hotwell; and to set the fan above the condenser with the separator still higher being careful that the separator is of ample size to allow the requisite time for complete separation therein.

It will be manifest that the term gases herein is intended to include all of the products of combustion not falling by its own weight from the fuel and it will also be clear that while combustion has been set forth as occurring in a furnace any other place of combustion (for example an internal combustion engine cylinder) might be as well served while many other modifications in the whole and in the parts thereof will be well within the skill of those familiar with the combustion arts.

What I claim is:—

In a smoke treating process the steps which comprise, withdrawing the smoke from the furnace in which it is produced and cooling the same by heat exchange, further reducing the temperature of said smoke by heat exchange to a second medium, increasing the velocity of smoke movement and adding steam thereto, subjecting the mixed smoke and steam to liquid spray to reduce its temperature and volume and to remove portions thereof by condensation and precipitation, removing the reduced volume of vapors from the spray and subjecting the same to mechanical sparation to further remove particles therefrom, utilizing the vapors after said mechanical separation for cooling purposes in the first mentioned heat exchange, and returning the clean heated gases to the furnace.

Signed at Chicago, county of Cook, State of Illinois, this 17th day of January, 1927.

WALTER LOUIS.